I. SORAAS.
METHOD OF PRECIPITATING LIGNIN FROM WASTE SULFITE LIQUOR.
APPLICATION FILED SEPT. 24, 1917.
1,297,028.
Patented Mar. 11, 1919.
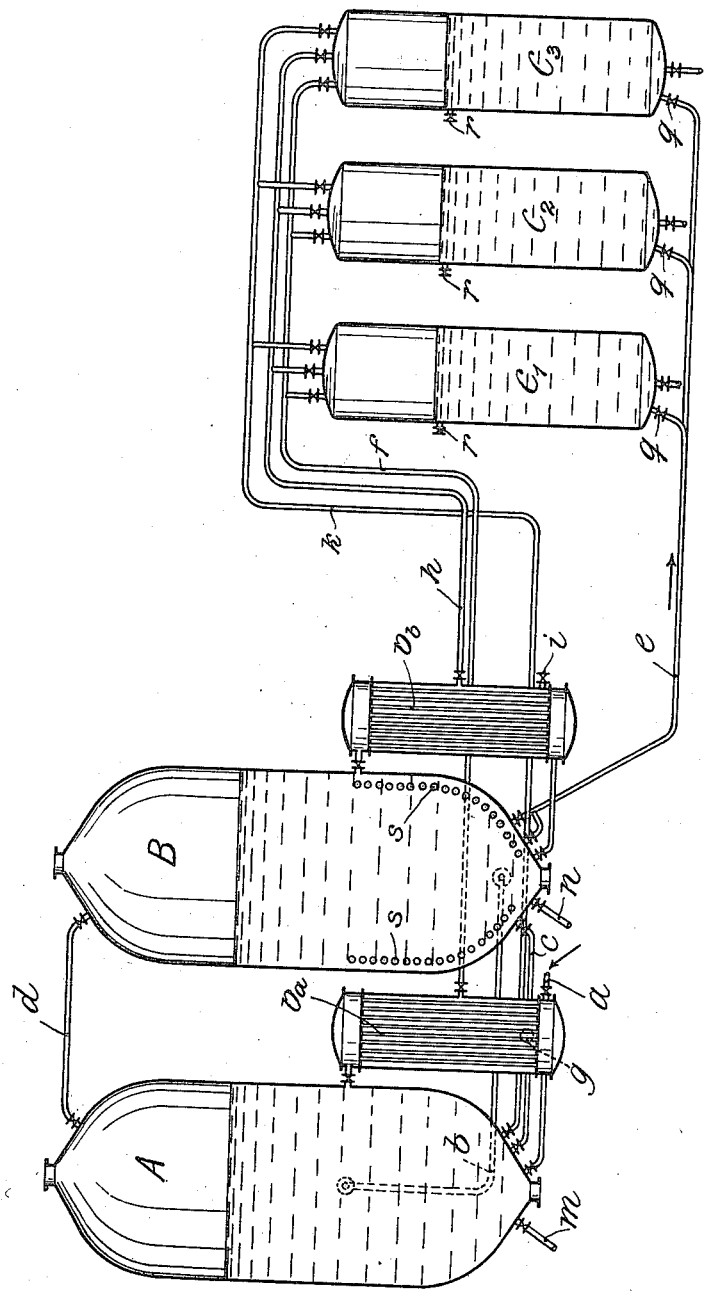
Inventor:
Ingvar Söraas
by
Attorney

UNITED STATES PATENT OFFICE.

INGVAR SÖRAAS, OF AALVIK, OVAM, NORWAY.

METHOD OF PRECIPITATING LIGNIN FROM WASTE SULFITE LIQUOR.

1,297,028.

Specification of Letters Patent.   Patented Mar. 11, 1919.

Application filed September 24, 1917. Serial No. 193,001.

*To all whom it may concern:*

Be it known that I, INGVAR SÖRAAS, citizen of Norway, and resident of Aalvik, Ovam, in the county of Söndre Bergenhus and State of Norway, have invented certain new and useful Methods of Precipitating Lignin from Waste Sulfite Liquor, of which the following is a specification.

It is known to precipitate the lignin substance from the waste liquor coming from the sulfite cellulose process by heating the liquor in autoclaves to a high temperature (200–210 degrees C.) and under a corresponding pressure.

On account of the high pressure these autoclaves must have a comparatively small inner space, and therefore their productive power is also small. In addition thereto the heating—for the purpose of saving heat—is usually effected in two stages. During the first stage the heating is indirectly effected completely or partly by steam passed through steam coils arranged within the autoclaves and creating a temperature which is slightly below the precipitation temperature of the lignin substance, whereas direct supply of steam into the body of the liquor is used during the second stage of the heating process. The precipitated lignin substance, however, is settled upon the steam coils within the autoclaves and therefore will be very burdensome to the operation. The productive power is reduced to a high degree, because the settled substance burns fast to the coils, whereby not only the heat transmission is considerably reduced but also a quick and complete emptying of the autoclaves is rendered difficult. The heating period and the emptying period are very much increased. Besides, the necessary cleaning of the coils after each digestion is always very burdensome and is connected with loss of heat, because the autoclaves must be well cooled, before a man can enter them and remove the inner covering. The energetic mechanical working upon the coils (such as hammering, scraping, chiseling, etc.) is also very detrimental to the coils.

According to the present invention these inconveniences are overcome in a simple and safe manner. The invention consists in a method which is characterized by this that the first stage of the heating is carried out in a separate vessel or digester, which can be constructed for a comparatively low pressure, whereas the final heating is carried out in other autoclaves constructed for the necessary higher pressure. In the first-mentioned low-pressure digesters all the indirect heating is effected, whereas direct supply of steam is used in the last autoclaves. In the latter therefore all devices such as coils and pipes for indirect heating are dispensed with. As this final heating requires only a short time, the productive power of these autoclaves is very considerably increased, and at the same time large quantities of heat are saved. Besides all inconveniences connected with cleaning and repairs of the coils are obviated. As in the digesters intended for the first stage only a simple heating of the liquor takes place, and as also the pressure is comparatively low, these digesters can be made so large that they will take many times the quantity of the autoclaves intended for the final heating. The digesters therefore will serve as a sort of magazine for the autoclaves, to which the liquor is supplied at suitable intervals. On account of the great size of the first digesters the liquor may be supplied thereto in a continuous stream, whereby for the first part of the process a continuous working is obtained. The importance of this result needs no further explanation.

The accompanying drawing shows by way of example a diagrammatical view of a plant intended for precipitating the lignin substance coming from the sulfite cellulose digesters.

—A— and —B— represent two large low-pressure digesters (volume of each going up to for instance 100–150 cubic meters or more) arranged for continuous supply of the waste liquor and for indirect heating by means of outside heating devices or chambers —$v_a$— and —$v_b$—. Of course heating coils may also be arranged within the digesters for effecting the heating such as indicated at —s— for the digester —B—. —$C_1$ $C_2$ $C_3$— represent autoclaves, in which the liquor is subjected to the final treatment under a high pressure (20 to 22 kg. per square cm.) and at a temperature of 200–210 degrees C. by direct supply of steam. In these autoclaves the precipitation of the lignin substance of the liquor takes place. The waste liquor, which may have been partly rid of its lime contents and which has been treated by sulfuric acid, is pumped in a regular and continuous stream through a pipe —a— into the digester —A—. This digester communicates through the pipe —b—, the spare conduit —c— and the gas pipe —d— with the digester —B—, so that the level will be very nearly the same in the two digesters —A— and —B—. From the digester —B— the autoclaves —C₁ C₂ C₃— may be filled with the necessary quantity of liquor through the pipe —e—. In the digester —A— the liquor is heated by means of the steam and gas coming through the pipe —f— from the autoclaves during the blowing-off. This steam and gas is conducted into the heating device —$v_a$— (or supplied to coils —s— within the digesters, or in combination), whereas the condensed product is taken out through the valve —g—. The waste liquor in —A— thus preheated circulates into the digester —B—, in which the further heating up to say 140–150 degrees C. is carried out by means of the hottest steam which comes from the autoclaves and is supplied through the conduit —h— to the heating device —$v_b$— (or to coils —s— within the digester, or in combination), whereas the condensed products are taken out through the valve —i—. If the obtaining of the above mentioned temperature necessitates that also fresh steam from the steam boiler plant must be used, this steam may be supplied to the digester —B— through the coils —s—. The pressure in —A— and —B— (over pressure) is during the whole operation maintained between for instance 5 and 7 kg. per square cm., and through the pipe —k— gas may be forced directly in from the autoclaves. The compressed air for oxidation necessary for the first stage may be introduced into —A— and —B— through valves —m— and —n—. However, it usually may be advantageous to introduce the air for oxidation first into the autoclaves so as to prevent possibly the development of reaction-heat in the digesters —A— and —B—, whereby the heat of the waste gases is best utilized.

The digesters —A— and —B—, which constitute a magazine for the autoclaves —C₁ C₂ C₃—, may for instance be filled with about ⅔ of liquor and ⅓ of gas. The filling of the autoclaves —C₁ C₂ C₃— with the liquor heated to for instance 140–150 degrees C. is effected one after the other at certain regular intervals from the digester —B—, the liquor being simply pressed over. The emptied autoclave is filled first with waste gas from another autoclave under a pressure of for instance 4–5 atm., whereupon the liquor is introduced through the pipe —e— and the valve —q—. By leading out gas through the pipe —f— or —h—, the level of the liquor within the autoclave usually filled up to about ⅔ may be controlled accurately. For inspecting the level of the liquor within the autoclaves an ordinary water gage may be used, or a cock —r— may be arranged at the level line. When the liquor begins to drip out through the cock, the correct valve —q— is then closed. An electric signaling device may of course also be arranged.

In this manner the autoclaves may be filled in the course of a few minutes, and as soon as the level has been reached, the autoclaves are ready for working by compressed air and direct steam supply. The emptying of the autoclaves takes place by blowing-off and subsequent rinsing with water. As no hindrances such as steam coils, pipe fittings, etc., are present, the blowing-off and subsequent rinsing is carried out in a moment, whereas these operations were hitherto very burdensome. Hitherto the liquor has been held within the autoclaves for about 2–3 hours or more. This period is reduced by the present invention to 20–30 minutes. At the same time the emptying period is reduced to nearly the half, and all subsequent treatment of coils, etc., is dispensed with. Therefore the high-pressure autoclaves obtain a productive power which is considerably higher than hitherto, and in addition thereto the manipulation has become much more simple.

Having now described my invention, what I claim as new and desire to secure by Letters Patent is:

1. The process of precipitating the lignin substances from the waste liquor from the sulfite cellulose process, which comprises heating the liquor in a suitable vessel by indirect heating to a temperature somewhat below the precipitation temperature of the lignin substance, transferring the heated liquor to a second vessel, and raising the temperature of the liquor in the second vessel, to effect precipitation of the lignin substance, by direct heating.

2. The process as claimed in claim 1, wherein the liquor is heated by indirect heating in the first vessel to a temperature of approximately 140 to 150 degrees centigrade.

3. The process of precipitating the lignin substance from the waste liquor from the sulfite cellulose process which comprises continuously supplying the waste liquor to a comparatively large vessel, heating the liquor in said vessel by indirect heating to a temperature somewhat below the precipitation temperature of the lignin substance, continuously conducting the heated liquor from said vessel to a plurality of smaller vessels in succession and raising the temperature of the liquor in said smaller vessels to effect precipitation of the lignin substance by the direct supply of steam into the body of liquor contained in said vessel.

4. The process as claimed in claim 1, wherein the liquor is indirectly heated in the first vessel by the use of steam and gas formed within the second vessel during the blowing off operation in the latter vessel.

5. The process as claimed in claim 1, wherein the first heating of the liquor is effected in stages by passing the liquor in succession through a plurality of vessels connected in series and in each of which the liquor is subjected to indirect heating.

6. The process as claimed in claim 5, wherein the liquor is heated to successively increasing temperatures in the series of vessels for effecting the first heating by the use of steam and gas formed within the second vessel during the blowing off operation in said vessel, the steam and gas of greatest temperature formed during the said blowing off operation being introduced into the last vessel of the series for effecting the first heating and steam and gas of successively decreasing temperatures being introduced into the remaining vessels in succession.

7. The process as claimed in claim 3, wherein the smaller vessels for the second heating of the liquor are each filled by first supplying thereto waste gas from another of said vessels, until a pressure of approximately four to five atmospheres has been established, and then forcing into said vessel preheated liquor from the comparatively large vessel in which the first heating is effected.

Signed at Bergen, in the State of Norway, this 23d day of July, A. D. 1917.

INGVAR SÖRAAS.

Witnesses:
 HARRY SAMUEL WATERMAN,
 KARL JOHAN ANDERSEN.